United States Patent [19]

Lohman

[11] Patent Number: 5,004,083
[45] Date of Patent: Apr. 2, 1991

[54] COUPLING FOR A BICYCLE

[76] Inventor: Oskar R. Lohman, Smedevaegen 16, S-131 33 Nacka, Sweden

[21] Appl. No.: 424,227
[22] PCT Filed: Apr. 13, 1988
[86] PCT No.: PCT/SE88/00191
§ 371 Date: Nov. 29, 1989
§ 102(e) Date: Nov. 29, 1989
[87] PCT Pub. No.: WO88/07955
PCT Pub. Date: Oct. 20, 1988

[30] Foreign Application Priority Data

Apr. 13, 1987 [SE] Sweden .................. 8701526-9

[51] Int. Cl.$^5$ ............... F16D 41/24; F16D 67/00
[52] U.S. Cl. .......................... 192/5; 192/46; 192/6 A; 192/48.92
[58] Field of Search ............ 192/5, 46, 48, 92, 64; 188/24.17, 71.2

[56] References Cited

U.S. PATENT DOCUMENTS

| 2,094,687 | 10/1937 | Thompson | 192/5 |
| 4,134,481 | 11/1979 | Calderazzo | 192/5 |
| 4,187,728 | 2/1980 | Mazzorana | 192/46 |
| 4,702,486 | 10/1987 | Tsuchie | 192/46 |
| 4,727,965 | 3/1988 | Zach et al. | 192/6 A |
| 4,766,772 | 4/1988 | Tsuchie | 192/48.92 |

Primary Examiner—Rodney H. Bonck
Assistant Examiner—Nicholas Whitelaw
Attorney, Agent, or Firm—Beveridge, DeGrandi & Weilacher

[57] ABSTRACT

A coupling for a bicycle provided with a pedal operated brake actuator (8) which is separated from the drive chain, comprising a first freewheel coupling (8) which is associated with the pedal assembly for torque transfer to the brake actuator (8) at reverse rotation of the pedal crank, and a second freewheel coupling (43; 64; 143) for torque transfer to the drive wheel at forward rotation of the pedal crank, and a third freewheel coupling which is associated with the drive wheel and arranged to deactivate either of said first freewheel coupling or said second freewheel coupling (43; 64; 143) by means of a shifter (30; 65; 130) at reverse rotation of the drive wheel. A slip clutch (35, 36; 67, 69; 135, 136) is arranged to enable greater freedom of rotation as said third freewheel coupling is engaged.

14 Claims, 8 Drawing Sheets

FIG. 6
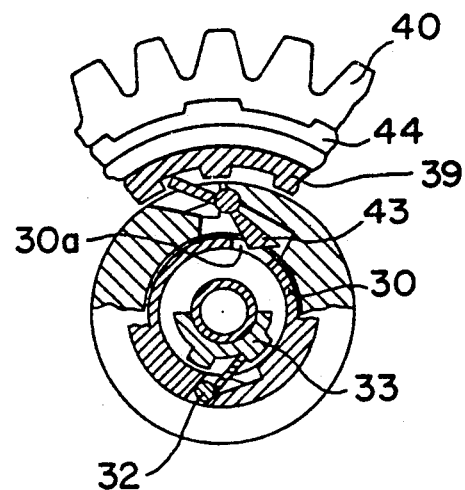
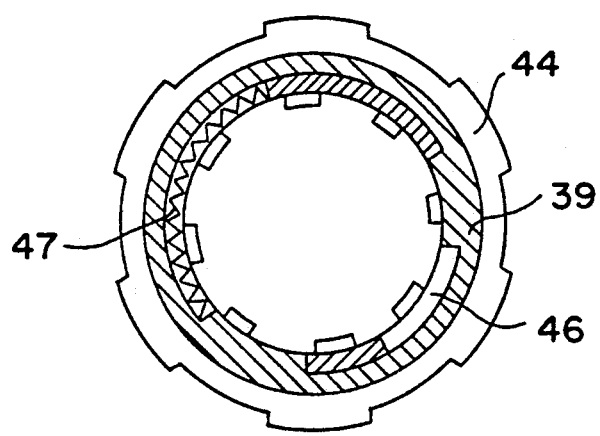
FIG. 7

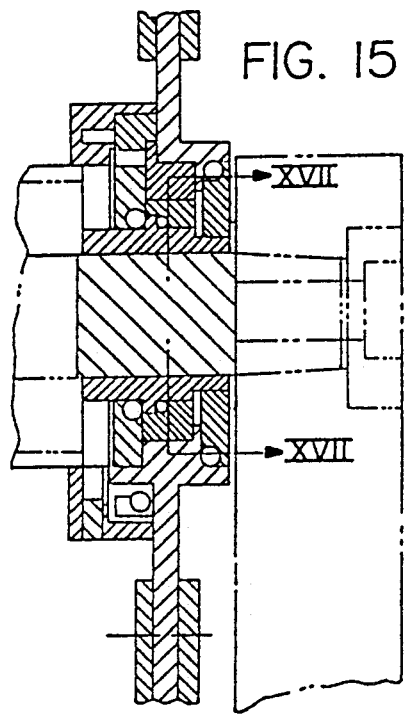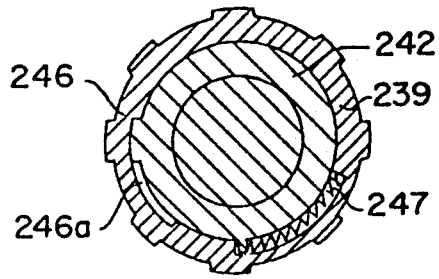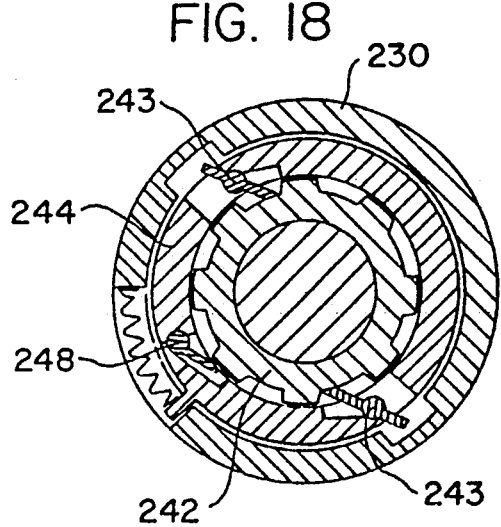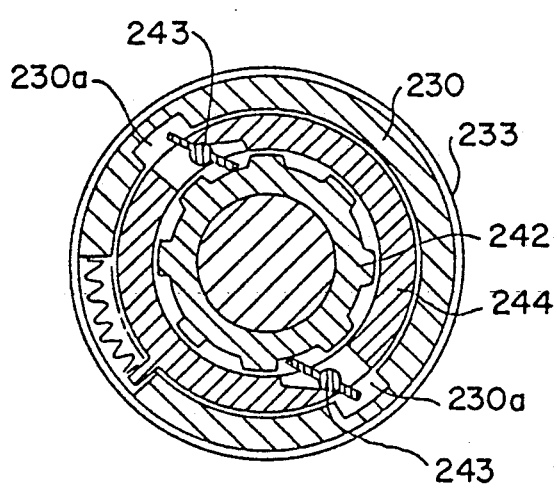

COUPLING FOR A BICYCLE

This invention relates to a coupling means for a bicycle provided with a pedal operated brake activating means separated from the drive chain, and which comprises a first freewheel coupling associated with pedal crank for torque transmission to the brake activating means at reverse rotation of the pedal crank and a second freewheel coupling associated with the drive wheel of the bicycle for torque transmission to the drive wheel at forward rotation of the pedal crank.

One problem inherent with previously known bicycle designs of this type resides in the fact that the freewheel coupling in the pedal crank assembly and the drive wheel hub have had such an engagement direction that by rearward movement of the bicycle, i.e. when the drive wheel is rotated in its reverse direction, such a rearward movement is transferred by the chain to the pedal crank and further to the brake activating means, whereby the brake is activated and the bicycle is locked dead.

This invention intends to accomplish a device which automatically will inactivate the braking function at reverse rotation of the drive wheel.

Embodiments of the invention are herein below described in detail under reference to the accompanying drawings.

On the drawings:

FIG. 6 shows a section along line VI—VI in FIG. 5.

FIG. 7 shows a section along line VII—VII in FIG. 5.

FIG. 15 shows, partly in section, a view of the pedal crank assembly of the bicycle according to another embodiment of the invention.

FIG. 16 shows a section along line XVI—XVI in FIG. 14

FIG. 17 shows a section along line XVII—XVII in FIG. 15

FIG. 18 shows a section along line XVII—XVII in FIG. 15 according to another embodiment of the invention.

Figure 1:
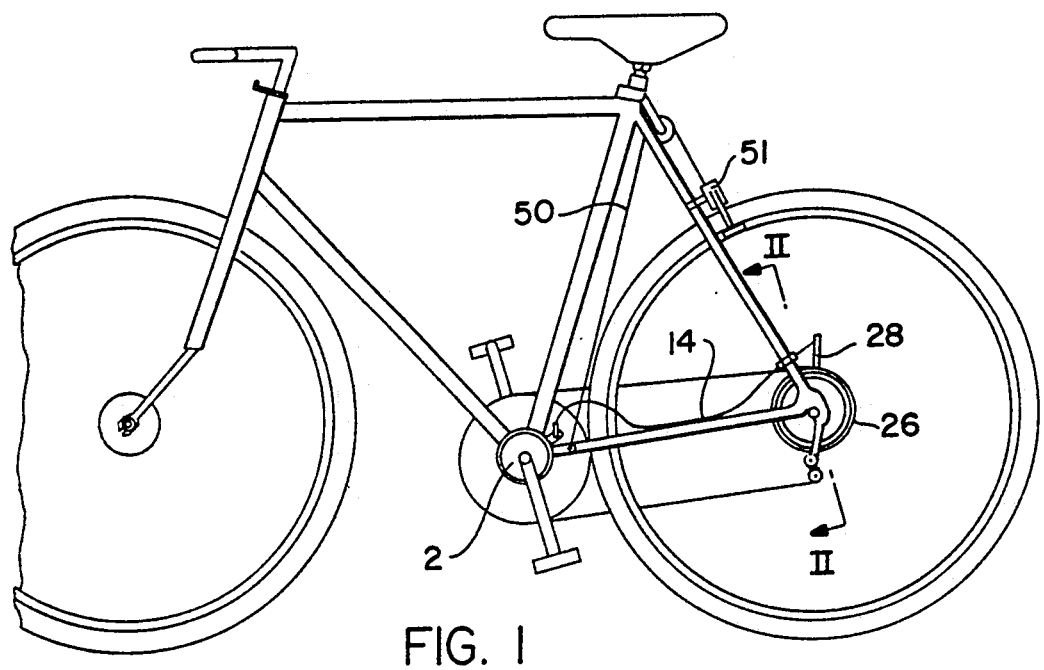
FIG. 1 shows a side elevation of the bicycle comprising the pedal crank assembly, the drive wheel and the brake device.

The bicycle which is illustrated in FIG. 1 comprises a pedal crank assembly in which is journalled a pedal crank shaft 2 provided with rigidly attached pedal arms and a sprocket wheel by which a chain is connected to the drive wheel of the bicycle. The pedal crank assembly also comprises a brake activating means which by means of a wire 50 is connected to a rim brake 51.

Figure 3:
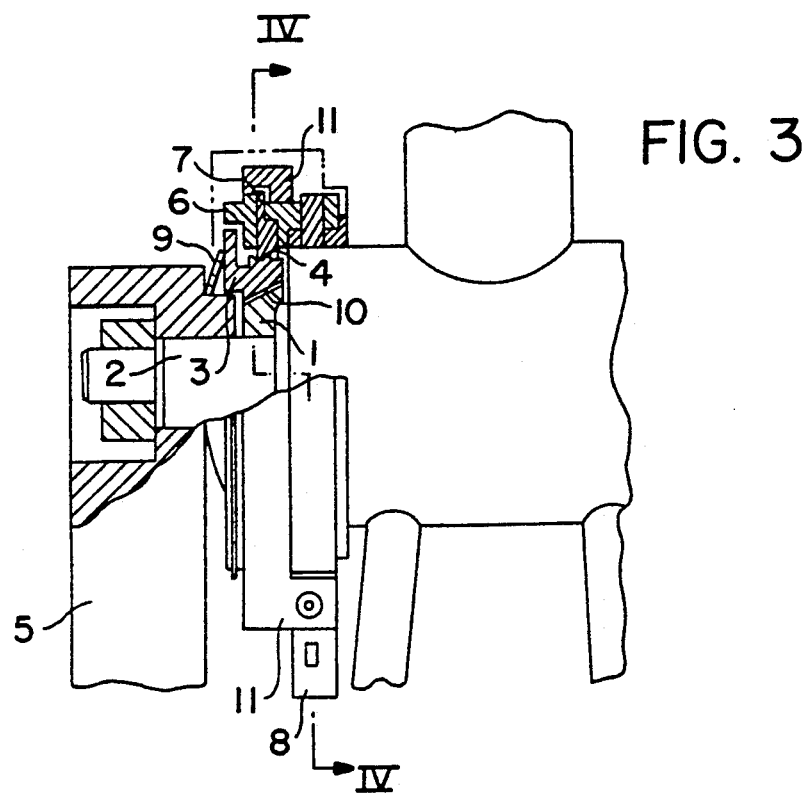
FIG. 3 shows, partly in section, a view of the pedal crank assembly of the bicycle.
Figure 4:
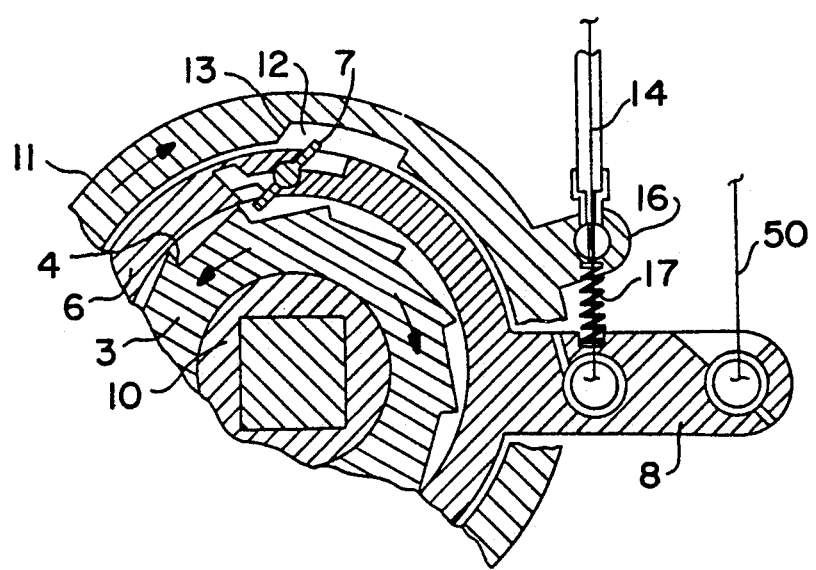
FIG. 4 shows a section along line IV—IV in FIG. 3 and illustrates the brake activating means as well as the disengagement means.

The brake activating means at the pedal crank assembly comprises a sleeve 1 which is rigidly attached to the crank shaft 2, a rotating ring 3 surrounding the sleeve 1 and being drivingly connected to the latter via friction surface 10. See FIG. 3. These friction surfaces 10 are concial and are pressed together by means of a washer spring 9 which acts against one of the pedal arms 5. The rotating ring 3 is provided with ratchet teeth 4 for cooperation with a number of catches 7. The latter are pivotally supported on a ring 6 which in turn is formed with a radially extending activating arm 8. See FIG. 4.

At forward rotation of the pedal shaft, the catches 7 remain unengaged in that they are pivoted away from the teeth 4 of the rotating ring 3. At reverse rotation of the pedal cranks, the cathes 7 will engage positively the teeth 4 and thereby make the ring 6 rotate in a reverse direction and exert and activating movement on the arm 8. The arm 8 is coupled to the rim brake 51 by the wire 50. At too high a brake activating force applied on the pedal cranks, a slipping movement will occur between the friction surfaces 10 so as to protect the device against overloads.

On the outer periphery of the ring 6, there is journaled a disengagement ring 11 which by means of a wire 14 is connected to an activating device on the drive wheel. The ring 11 is formed with grooves 12 which is located just outside the catches 7 as the ring 11 occupies its inactive position. As the disengagement device is activated, the ring 11 will be rotated by the wire 14 such that one of the edges 13 of the grooves 12 will engage and pivot the catches 7 and, thereby, inactivate the brake activating coupling. This occurs at reverse rotation of the drive wheel and prevents the braking device, i.e. the rim brake 51, to be activated and lock the bicycle dead.

Figure 2:
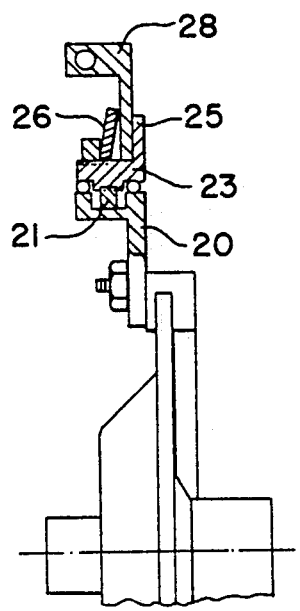
FIG. 2 shows cross-section along line II—II in FIG. 1 including a disengagement means according to the invention.

In order to accomplish the above described disengagement of the brake activating means, the hub of the drive wheel is provided with an external freewheel coupling in the form of catches 21 arranged between a ring 20 mounted on the hub and an activating ring 23. See FIG. 1 and 2. The activating ring 23 is coupled to a wire activating arm 28 by means of a friction coupling 25, 26. At reverse rotation of the drive wheel, the catches 21 will establish a rigid connection between the ring 20 and the activating ring 23 and, thereby, move the activating arm 28 backwards, and through the wire 14 rotate ring 11 and disengage the catches 7 in the pedal crank assembly. For enabling a longer reverse movement of the drive wheel, the friction coupling 25, 26 will allow the activating arm 28 to slip relative to the activating ring 23.

Figure 5:
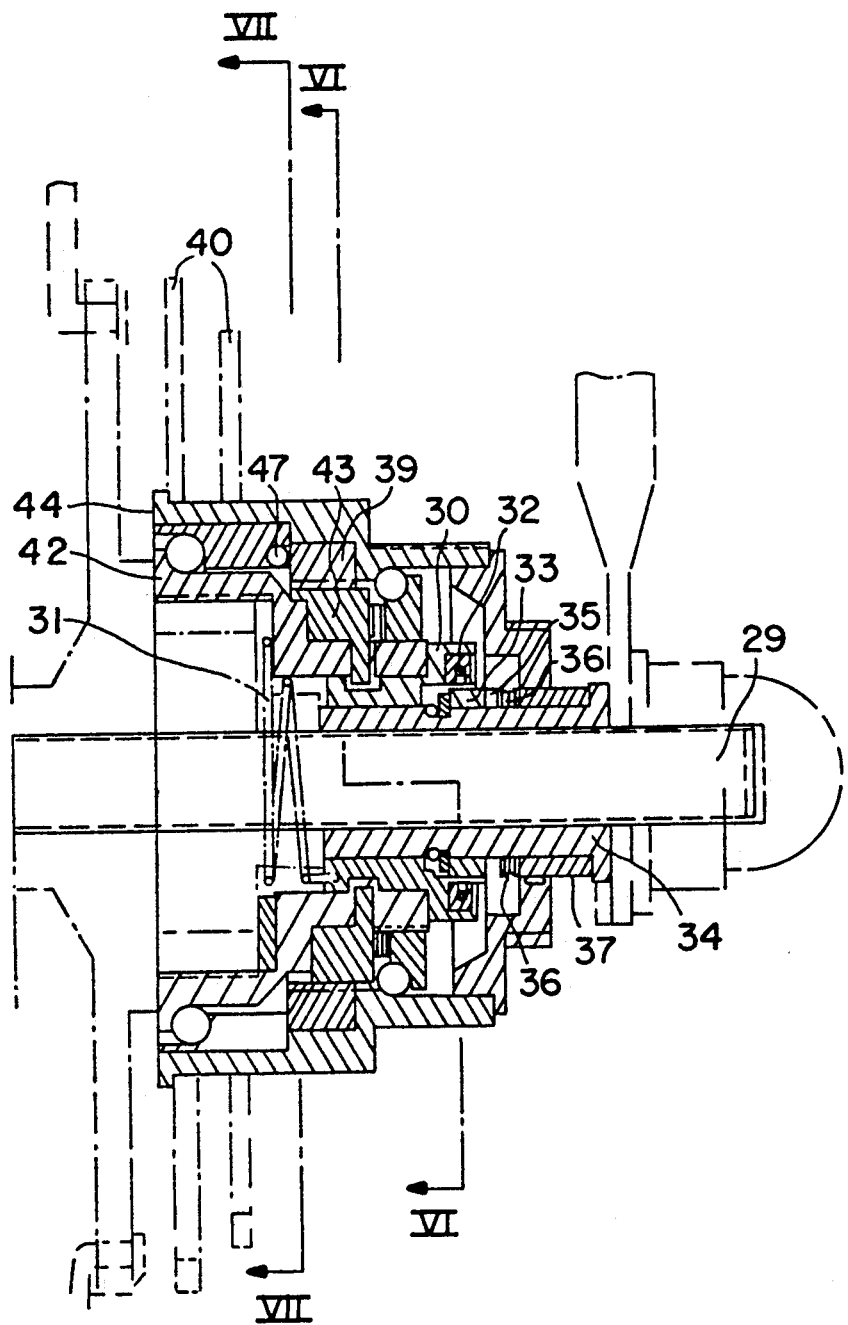
FIG. 5 shows a disengagement device according to the invention located in the hub of the drive wheel.

According to the above described embodiment of the invention, the bicycle comprises a freewheel coupling associated with the drive wheel and which by means of an activating means is inteded to inactivate the brake activating device in the pedal crank assembly. In FIG. 5, 6 and 7, there is shown an embodiment of the invention in which the disengagement device is located within the hub of the drive wheel and arranged to inactivate the freewheel coupling of the drive wheel by which the drive force is transmitted from the chain sprocket to the drive wheel. In the embodiment of the hub shown in FIG. 5, the disengagement device is located at the hub of the drive wheel and comprises a non-rotating shaft 29 locked to the frame of the bicycle. In the drive wheel, there is immovably connected a hub sleeve 42 which on its outside supports a drive sleeve 44 journalled on ball bearings. On the drive sleeve 44, there are rigidly mounted a number of chain sprockets 40 of different sizes. The drive sleeve 44, which is rotatably journalled on the hub sleeve 42, is arranged to transfer the drive force from the chain and the chain sprockets 40 to the wheel via a number of catches 43, which form a freewheel coupling between the drive sleeve 44 and the hub sleeve 42.

In order to accomplish a discontinuation in the connection between the wheel and the brake activating means in the pedal crank assembly and, thereby, avoid a locking dead of the bicycle at reverse movement, this embodiment of the invention comprises means in the drive wheel hub for deactivating the catches 43. For that purpose, a deactivating sleeve 30 is journalled in the hub sleeve 42. The deactivating sleeve 30 is arranged to move the catches 43 to an inactive positon at rearward movement of the wheel. This is accomplished by means of catches 32 and a tooth ring 33 journalled on a non-rotating sleeve 34.

The catches 32 and the tooth ring 33 form a third freewheel coupling which has the same direction of engagement as the freewheel coupling in the pedal crank assembly as well as the freewheel coupling between the drive sleeve 44 and the hub sleeve 42. The tooth ring 33 is coupled to the non-rotating sleeve 34 by means of a friction coupling 35, 36 for enabling slippage of the tooth ring 33 at extended rearward movement of the wheel. As being illustrated in FIG. 6, the disengagement sleeve 30 is formed with openings 30a into which the catch 43 extends at normal operation of the bicycle. At reverse rotation and locking of the deactivating sleeve 30 by means of the catches 32, the sleeve 30 will force the catch 43 out of the opening 30a, and thereby, move the catch 43 out of engagement with the drive sleeve 44. The openings 30a have a larger circumferential extent that the catch 43 and enables a rotational play between the sleeve 30 and the catch 43. This play is intended to give a delay of the disengagement of the catch 43. Return movement of the sleeve 30 is ensured by a torsion spring 31.

For preventing any kind of load from acting on the catch 43 and make disengagement of the latter more difficult when acted upon by the sleeve 30, the drive sleeve 44 is provided with a coupling ring 39 which is rotationally locked relative to the latter except for a play 46. See FIG. 7. To ensure that this play will always offer a certain degree of free running of the ring 39 at the start of the reverse movement of the wheel, there is incorporated a spring 47 which is active to turn the sleeve 39 in that direction in which the play to the drive sleeve 44 is ensured. This rotational play between the ring 39 and the drive sleeve 44 also intends to avoid locking dead of the bicycle at heavy braking. Due to the elasticity of the brake force transmitting means, a rotational play is required to avoid the drive catch 43 to engaging before the brake has been released.

In the above described embodiments of the invention, there are described two alternative locations of a third freewheel coupling in order to accomplish a deactivation of anyone of the other freewheel coupling, i.e. either the freewheel coupling in the pedal crank assembly or the freewheel coupling in the drive wheel hub, and in which deactivating means are incorporated to avoid locking dead of the bicycle at a longer reverse movement of the bicycle.

Figure 8:
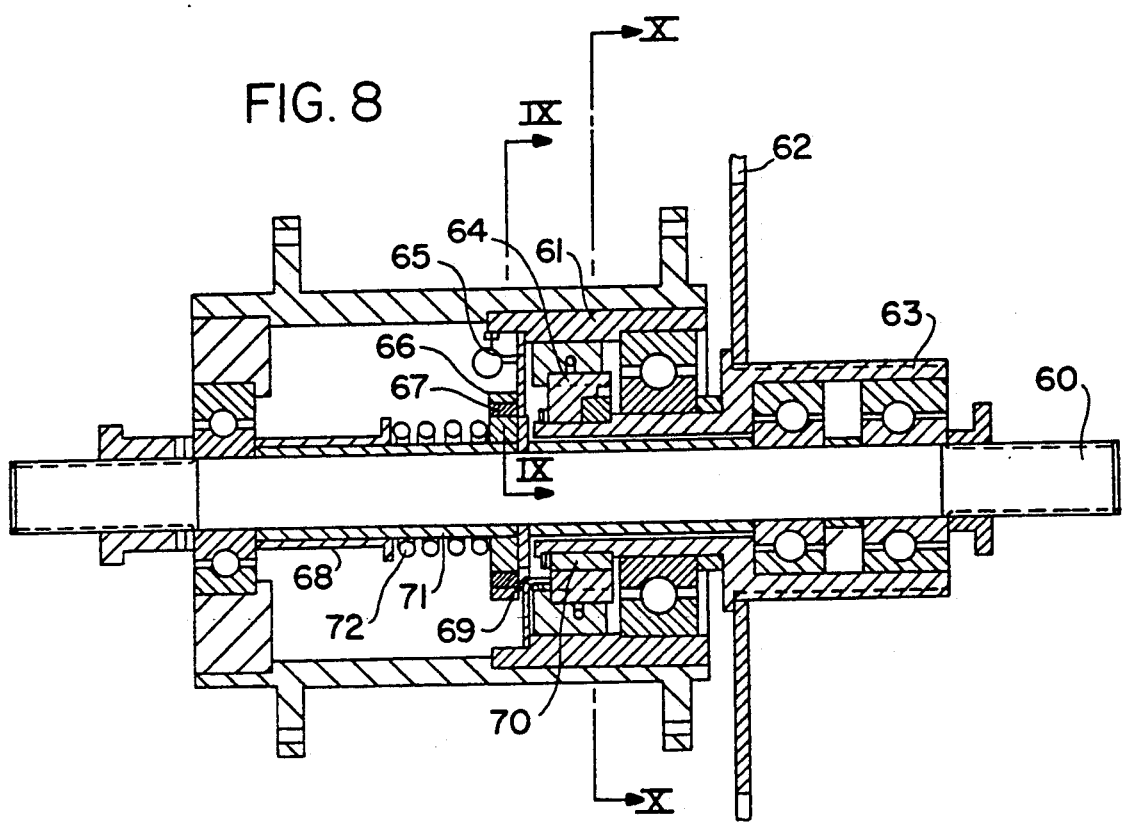
FIG. 8 shows a longitudinal section through the hub of the drive wheel according to an alternative embodiment of the invention.
Figure 9:
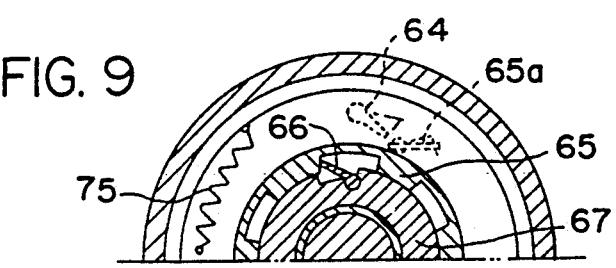
FIG. 9 shows a section along line IX—IX in FIG. 8.
Figure 10:
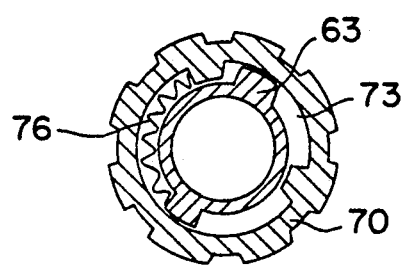
FIG. 10 shows a section along line X—X in FIG. 8.

In FIG. 8, 9 and 10, there is shown an alternative embodiment of the invention in which a deactivating means is incorporated in the hub of the drive wheel for deactivating the freewheel coupling of the drive wheel by which the drive torque is transferred from the chain sprocket to the wheel. In the embodiment shown in FIG. 8, the deactivating means comprises a non-rotating shaft 60 rigidly locked to the bicycle frame. A hub sleeve 61 is rigidly attached to the drive wheel and is journalled by means of a ball bearing on a drive sleeve 63. The latter is in turn journalled on the shaft 60 by means of two ball bearings and carries a number of chain sprockets 62 of different sizes. The drive sleeve 63 is arranged to transfer a power from the chain and the chain sprockets 62 to the wheel via a number of catches 64 which form a freewheel coupling between the drive sleeve 63 and the hub sleeve 61.

In order to accomplish a discontinuation in the connection between the drive wheel and the brake activating means in the pedal crank assembly and to avoid locking dead of the bicycle at reverse movement, this embodiment of the invention comprises means in the drive wheel hub for deactiving the catches 64. For this purpose, there is journalled a toothed deactivating sleeve 65 in the hub sleeve 61, such that deactivating sleeve 65, via catches 66 and a catch supporting ring 67, is arranged to move the catches 64 to their rest positions at reverse rotation of the wheel. The catches 66 and the toothed deactivating sleeve 65 form a third freewheel coupling. The catch supporting ring 67 is journalled on a non-rotating sleeve 71 by means of a friction coupling to enable slippage at long reverse movements. The friction coupling comprises the catch supporting ring 67, a ring 69 firmly attached to the shaft 60 and a spring 72 for pressing together the catch supporting ring 67 and the ring 69. The spring 72 is axially supported by a sleeve 68. As being apparent from FIG. 9, the deactivating sleeve 65 is formed with a sloping surface 65a which leaves the catch 64 unaffected at normal operation of the bicycle. The deactivating sleeve 65 is kept in its inactive position by means of a pretensioned spring 75. At reverse movement and interengagement between the deactivating sleeve 65 and the catches 66, the deactivating sleeve 65 will force the catch 64 up on the sloping surface 65a, and thereby, move the catch 64 out of engagement with the drive sleeve 63.

For preventing any kind of load from acting on the catches 64 and make deactivation of the latter more difficult when acted upon by the deactivating sleeve 65, the drive sleeve is provided with a coupling ring 70 which is drivingly coupled to the drive sleeve 63 over a play 73. See FIG. 10. To make sure that this play will always enable a certain degree of freerunning of the coupling ring 70 at the start of the reverse movement of the wheel, there is provided a spring 76 which is active to turn the coupling ring 70 in the direction in which the play relative to the drive sleeve 63 is ensured. This rotational play between the ring 70 and the drive sleeve 63 also serves as an insurance against locking dead of the bicycle at heavy braking. Due to the elasticity in the brake force transmitting means, a rotational play is required to avoid the catches 64 to get engaged before the brake has been released.

Figure 11:
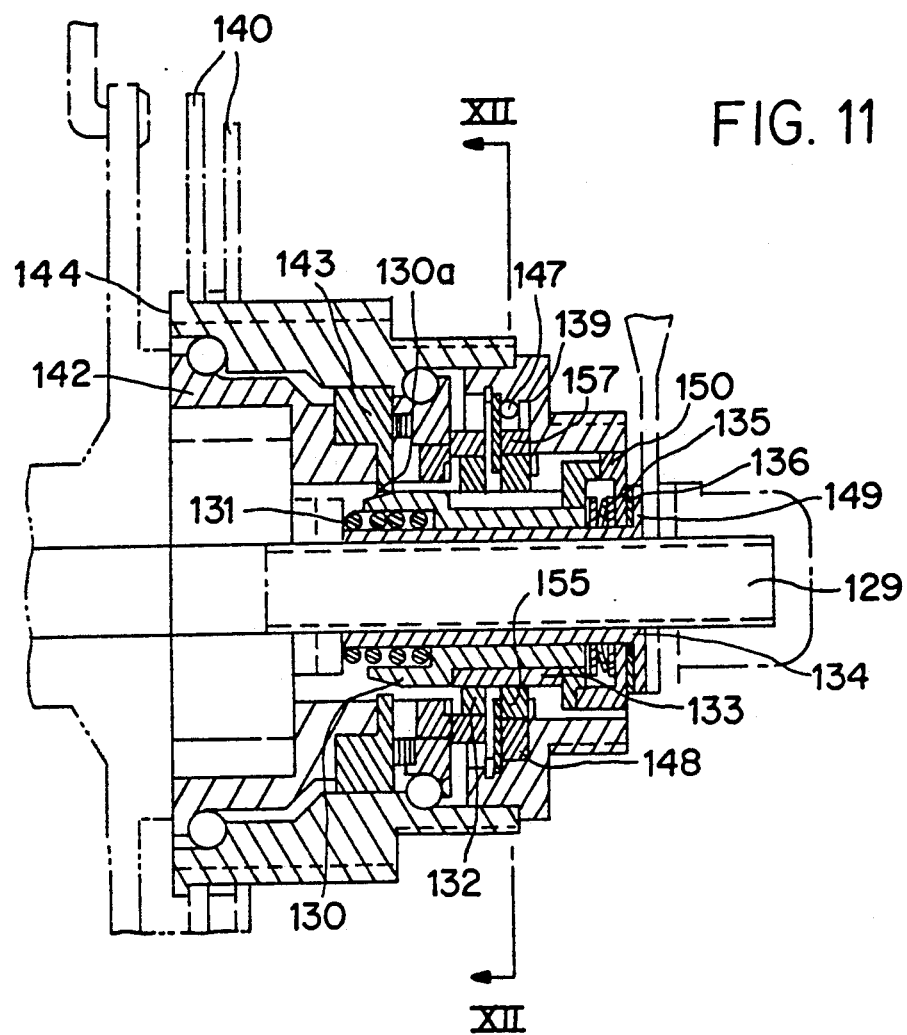
FIG. 11 shows a longitudinal section through the drive wheel hub according to another embodiment of the invention.
Figure 12:
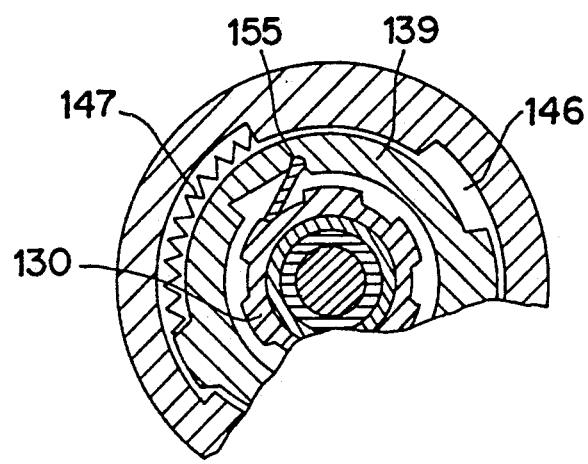
FIG. 12 shows a section along line XII—XII in FIG. 11.

In FIG. 11 and 12, there is shown still another embodiment of the invention in which the deactivating means is located inside the sprocket wheel unit of the drive wheel and arranged to deactivate the freewheel coupling by which the propulsion force of the bicycle is transmitted from the sprocket wheels to the drive wheel. According to this embodiment of the invention, the device comprises a non-rotatable shaft 129 rigidly attached to the frame of the bicycle. To the drive wheel, there is rigidly attached a sleeve 142 which on its outside carries a drive sleeve 144 journalled on a ball bearing. On the drive sleeve 144, there are non-rotatably mounted a number of chain sprockets 140. The drive sleeve 144 which is rotatably journalled on the hub sleeve 142 is intended to transmit the propulsion force from the chain sprockets 140 to the wheel by means of a number of catches 143 which form a freewheel coupling between the drive sleeve 144 and the hub sleeve 142. In order to accomplish a discontinuation of the connection between the drive wheel and the brake activating means in the crank assembly to thereby prevent locking dead of the bicycle at reverse movement, there is rotatably mounted a deactivating sleeve 130 within the hub sleeve 142. By means of catches 132 and a toothed ring 133 mounted on the deactivating sleeve 130, the latter is intended to move the catches 143 to their inactive positions at reverse rotation of the wheel. The catches 132 and the toothed ring 133 form a third freewheel coupling. The deactivating sleeve 130 which is formed with a sloping surface is coupled to a ring 150 with a corresponding sloping surface for accomplishing of an axial movement of the deactivating sleeve 130. The ring 150 is rotated by means of a friction coupling 135, 136 which allows the ring 150 to slip at longer reverse movement.

As been illustrated in FIG. 12, the deactivating sleeve 130 comprises a conical portion 130a which does not influence upon the catch 143 at normal operation of the bicycle, but is kept in inactive position by a pretensioned spring 131. At reverse rotation and activation of the deactivating sleeve 130 via the catches 132, the deactivating sleeve 130 will rotate and, at the same time, be axially displace by engagement of the sloped surfaces against the corresponding surfaces on ring 150. Thereby, the drive catches 143 are moved out of engagement with the drive-sleeve 144.

In the drive wheel hub shown in FIG. 11, there is comprised a fourth freewheel coupling, the purpose of which is to active the coupling sleeve 130 during braking so as to prevent locking dead of the bicycle at braking to stillstand. This freewheel coupling comprises a sleeve 148 in which is jounralled a coupling ring 139 which carries catches 155. The sleeve 148 is formed with grooves 146 which enables a rotational play of the coupling ring 139. A spring 147 acts to maintain this play at normal operation of the bicycle.

Figure 13:
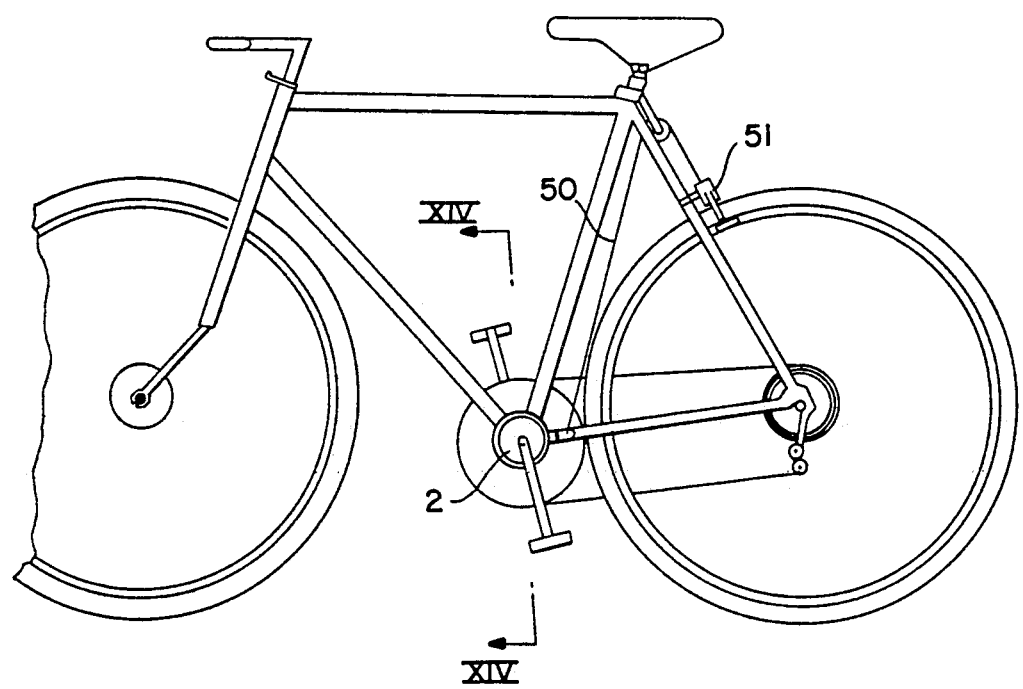
FIG. 13 shows a side elevation of the bicycle comprising assembly, the drive wheel and brake device

The bicycle which is illustrated in FIG. 13 comprises a pedal crank assembly in which is journalled a pedal crank shaft 2 provided with rigidly attached pedal arms and a sprocket wheel by which a chain is connected to the drive wheel of the bicycle. The pedal crank assembly also comprises a brake activating means which by means of a wire 50 is connected to a rim brake 51.

Figure 14:
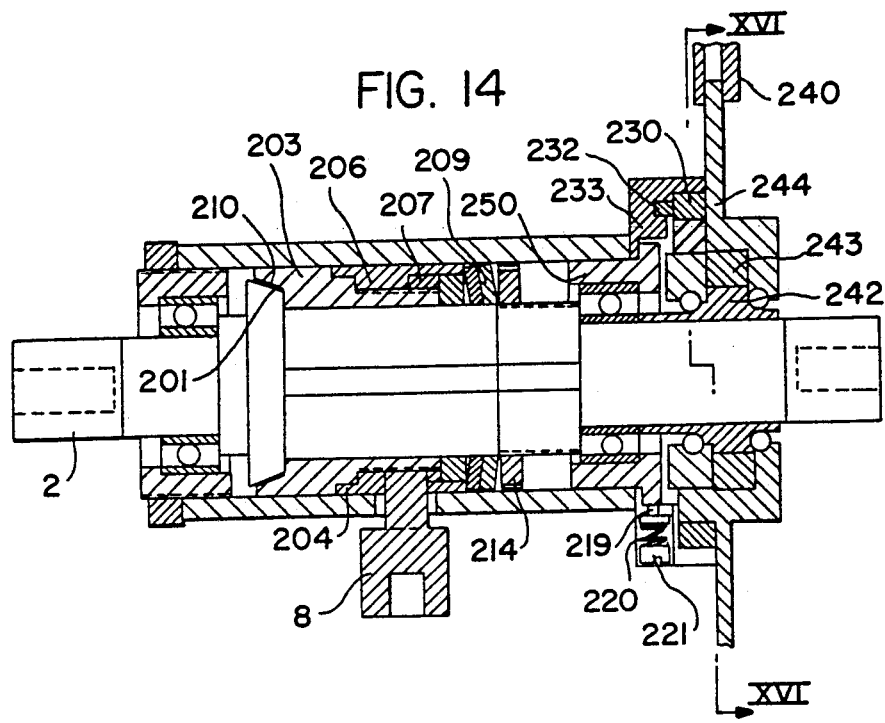
FIG. 14 shows cross-section along line XIV—XIV in FIG. 13 including a disengagement means according to invention.

The brake activating means at the pedal crank assembly comprises a sleeve 201 which is rigidly attached to the crank shaft 2, a rotating ring 203 surrounding the sleeve 201 and being drivingly connected to the latter via friction surfaces 210. See FIG. 14. These friction surfaces 210 are conical and are pressed together by means of a washer spring 209 which acts against an adjustable ring nut 214. The rotating ring 203 is provided with ratchet teeth 204 for cooperation with a number of catches 207. The latter are pivotally supported on a ring 206 which in turn is formed with a radially extending activating arm 8 for connection to the rim brake 51.

At forward rotation of the pedal shaft, the catches 207 remain unengaged in that they are pivoted away from the teeth 204 of the rotating ring 203. At reverse rotation of the pedal cranks, the catches 207 will engage positively the teeth 204 and thereby make the ring 206 rotate in a reverse direction and exert an activating movement on the arm 8. If too high a brake activating force is applied on the pedal cranks, a slipping movement will occur between the friction surfaces 210 so as to protect the device against overloads.

A freewheel coupling is provided between the pedal shaft 2 and the sprocket wheel 240 which in a common way is coupled to the rear wheel of the bicycle by means of a chain. This freewheel coupling in the pedal crank assembly comprises a sleeve 242 which is nonrotatably mounted on the pedal shaft 2 and which on its outer periphery supports a sprocket wheel carrying drive sleeve 244. The latter is jounralled on the sleeve 242 by means of ball bearings and arranged to transfer the drive force from the pedal shaft 2 to the sprocket wheel via couple of catches 243. The latters form a freewheel coupling between the shaft sleeve 242 and the drive sleeve 244.

In order to obtain, according to the invention, an interruption in the connection between the rear wheel of the bicycle and the brake activating means in the pedal crank assembly to thereby prevent locking dead of the bicycle at reverse movement, there are provided means in the pedal crank assembly by which the catches 243 are lifted out of engagement. To this end, a deactivation sleeve 230 is rotatably supported on the drive sleeve 244. The deactivation sleeve 230 is formed with a tooth ring för cooperation with catches 232 tiltably supported on a ring 233. The latter is rotatably mounted on a flanged, frame mounted sleeve 250, and arranged to disengage the catches 243 at reverse rotation of the drive sleeve 244 caused by reverse movement of the bicycle.

The catches 232 and the tooth ring on the deactivation sleeve 230 form a fourth freewheel coupling which has the same engagement direction as both the freewheel coupling in the rear wheel hub and the drive coupling 242–244 in the pedal crank assembly. The ring 233 which carries the catches 232 is coupled to the stationary flanged sleeve 250 by means of a friction coupling for enabling slipage at longer reverse movements. The friction coupling comprises one or move adjustment screws 221, each provided with a spring 220 and a friction element 219. These screws 221 are mounted in threaded through openings in the ring 233, and accomplish a frictional engagement with the outer surface of the flanged sleeve 250.

As illustrated in FIG. 16, the deactivation sleeve 230 is formed with recesses 230a in which the outer portion of the catches 243 are received during normal, forward movement of the bicycle. At reverse rotation of the sprocket wheel and the drive sleeve 244, the deactivation sleeve 230 is locked by the catches 232 and forces the catches 243 out of the recesses 230a and, thereby, out of engagement with the drive sleeve 244.

In order to prevent any kind of load from acting on the catches 243 and, thereby, making their disengagement harder, the sleeve 242 is provided with toothed ring 239. The latter is rotationally coupled to the sleeve 242 over a rotational play. This play is accomplished by a narrow external tooth 246 on the sleeve 242 in cooperation with a considerably wider recess 246a on the inside surface of the toothed ring 239. See FIG. 17. In order to ensure that the above mentioned play will always offer a certain amount of lost motion of the toothed ring 239 at the beginning of the reverse movement of the wheel, there is provided a spring 247 for biasing the ring 239 in the direction in which the play visavi the sleeve 242 is obtained. This rotational play also ensures that the bicycle is locked dead at real hard braking. Due to same resiliency in the brake force transmitting means, there is required a rotational play to prevent the catches 243 from reengaging before the brake is released.

In still another embodiment of the invention, illustrated in FIG. 18, there is mounted a catch 248 in the drive sleeve 244 having on opposite direction of engagement in relation to the drive catches 243 and being engaged at reverse rotation of the pedal crank. At continued reverse pedal crank movement, the drive catches 243 are disengaged (as described above), and due to the rotation of the deactivation sleeve 230 a further play will occur. The advantage by this arrangement is that the rotational play can be reduced. There will be a smaller lost motion each time you restart pedalling after having rest för a while during forward driving. The reason is that an extra play is provided at braking only. By this arrangement, is it possible to have a better control on the drive catches 243 in respect of the engagement shoulders after braking. Afther a heavy braking, the play is still same when restarting pedalling.

The embodiments of the invention are not limited to the above described exemples but may be varied within the scope of the claims.

I claim:

1. Coupling means for a bicycle having a drive wheel, a drive wheel hub, and a pedal crank assembly which operates a drive transmission and a brake activating means, said coupling means comprising:
   a first freewheel coupling associated with the pedal crank assembly for torque transfer to the brake activating means at reverse rotation of the pedal crank;
   a second freewheel coupling associated with the drive wheel hub of the bicycle for torque transfer to the drive wheel upon forward rotation of the pedal crank assembly;
   a third freewheel coupling associated with the drive transmission and adapted to be activated upon a reverse rotation of the drive wheel; and
   shifting means associated with said third freewheel coupling for preventing engagement of said second freewheel coupling when said third freewheel coupling is activated.

2. Coupling means according to claim 1, further comprising a slip clutch associated with said third freewheel coupling.

3. Coupling means according to claim 1, wherein said third freewheel coupling is located in the drive wheel hub, and said shifting means comprises a rotatable sleeve.

4. Coupling means according to claim 1, wherein said second freewheel coupling comprises a plurality of catches and a toothed ring, said catches being adapted for engagement with said toothed ring and said toothed ring being coupled to the drive transmission with a predetermined amount of rotational play.

5. Coupling means according to claim 4 further comprising a biasing means for biasing said toothed ring in one direction of rotational play.

6. Coupling means according to claim 1, wherein said shifting means includes a biasing means and an axial adjustable sleeve in contact with said biasing means.

7. Coupling means for a bicycle having a drive wheel, a drive wheel hub, and a pedal crank assembly for operating a drive transmission and a brake activating means, said coupling means comprising:
   a first freewheel coupling associated with the pedal crank assembly for torque transfer to the brake activating means at reverse rotation of the pedal crank;
   a second freewheel coupling associated with the drive wheel hub of the bicycle for torque transfer to the drive wheel upon forward rotation of the pedal crank assembly;
   a third freewheel coupling associated with the drive transmission;
   means for activating and deactivating said third freewheel coupling; and
   shifting means associated with said third freewheel coupling for preventing engagement of said first freewheel coupling when said third freewheel coupling is activated.

8. Coupling means according to claim 7, wherein said first freewheel coupling includes a slip clutch.

9. Coupling means according to claim 8, wherein said third freewheel coupling includes a slip clutch.

10. Coupling means according to claim 7, wherein said first freewheel coupling includes a rotatable ring having an outwardly extending radial arm.

11. Coupling means for a bicycle having a drive wheel, a drive wheel hub, and a pedal crank assembly for operating a drive transmission and a brake activating means, said coupling means comprising:
    a first freewheel coupling associated with the pedal crank assembly for torque transfer to the brake activating means at reverse rotation of the pedal crank;
    means in association with the drive wheel hub of the bicycle for torque transfer to the drive wheel hub upon forward rotation of the pedal crank assembly;
    a second freewheel coupling associated with the drive wheel hub and adapted to be engaged upon reverse rotation of the drive wheel; and
    engagement prevention means associated with said second freewheel coupling for preventing engagement of said first freewheel coupling while said second freewheel coupling is activated.

12. Coupling means according to claim 11, wherein said first freewheel coupling includes a rotating ring with ratchet teeth, said first freewheel coupling being in driving connection with the pedal crank assembly and having a support ring supporting a plurality of catches, and said first freewheel coupling having a radial arm extending thereoff for connection with the brake activating means, said catches adapted to assume a first positon wherein said rotating ring and support ring are engaged and a second position wherein said support ring and rotating ring are disengaged.

13. Coupling means according to claim 12, wherein said engagement prevention means includes a disengagement ring adapted for rotation about said support ring and having means for rotating said catches into said second position.

14. Coupling means for a bicycle provided with a pedal crank assembly for operation of a drive transmission including a drive chain and a brake activating means which is separate from the drive chain, comprising:
- a first freewheel coupling associated with the pedal crank assembly for torque transfer to the brake activating means at reverse rotation of the pedal crank;
- a second freewheel coupling associated with the pedal crank assembly for torque transfer to the drive chain at forward rotation of the pedal crank; and
- a third freewheel coupling associated with the pedal crank assembly of the bicycle and a shifting means connected to said third freewheel coupling and arranged to be activated by said third freewheel coupling at reverse rotation of the pedal crank assembly, and said shifting means including means for preventing engagement of said second freewheel coupling when said third freewheel coupling is activated.

* * * * *